Patented Feb. 12, 1952

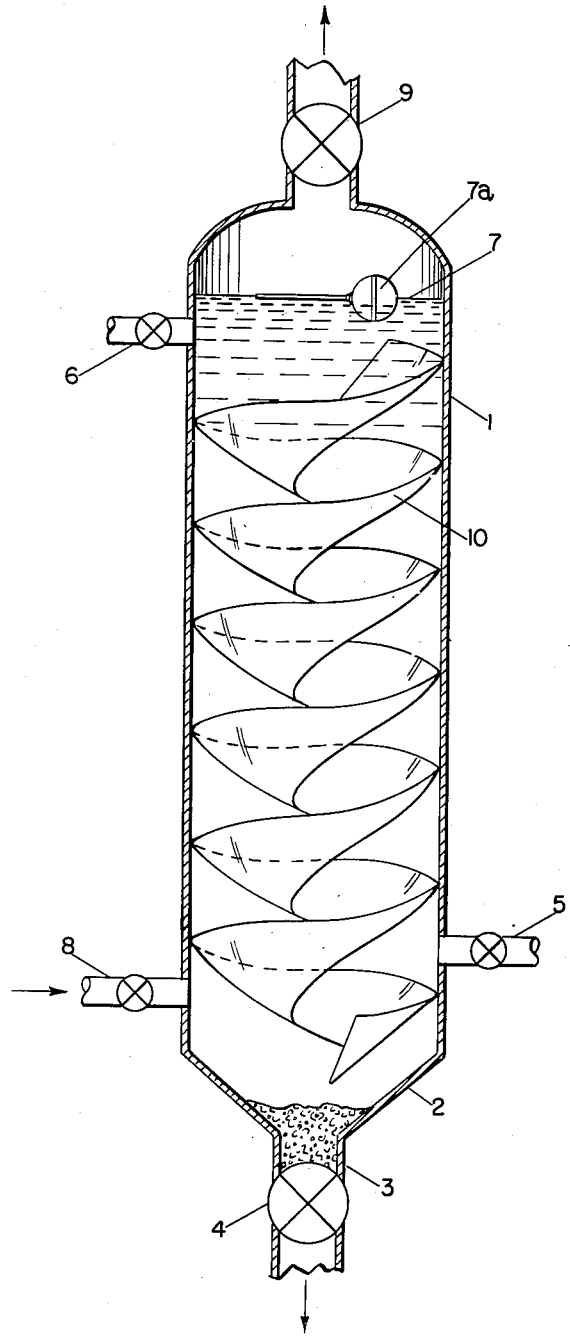

2,585,385

UNITED STATES PATENT OFFICE 2,585,385

PRECIPITATING TOWER

John F. Haller, Niagara Falls, N. Y., assignor to Mathieson Chemical Corporation Application July 9, 1948, Serial No. 37,759

2 Claims. (Cl. 23—283)

The present invention relates to improvements in contact towers and provides an improved tower especially adapted to the effecting of intimate contact between a gaseous medium and a liquid.

My improved tower may be used, with advantage, generally where it is desired to bring one fluid medium into contact with another, but is of particular utility in reacting a gaseous medium with a liquid, especially where a solid results from the reaction.

Briefly, the tower of my present invention comprises a vertically elongated chamber, advantageously cylindrical in transverse section, provided with suitable inlets and outlets for the reactants and effluents and having a spiral baffle extending therethrough from a point near the lower end to a point near the upper end of the cylindrical chamber.

Contact towers of this general type have previously been proposed. However, such towers, while highly effective when used for specialized purposes, have heretofore been subject to a number of disadvantages, especially when used to effect chemical reactions which result in the precipitation of solids. Such towers are frequently referred to as helical towers for the reason that the materials flowing therethrough are forced to follow a helical path. A primary purpose of the construction of helical baffles in such towers has been to lengthen the path of travel through the tower so as to prolong the period of contact between the reactants or other materials in a chamber of given size.

This has led to the use of spiral baffles of relatively low pitch. Further, for the same reason, such towers have been so constructed as to prevent the by-passing of the media around the spiral baffles or any part thereof, all of the media being forced to pass through the chamber along the helical path. This has usually been accomplished by forming a spiral around a central shaft or cylinder, coaxially positioned with respect to the elongated cylindrical chamber, the flights of the spiral extending at their outer edge to the inner wall of the chamber and extending at their inner edge to the central core so as to seal off any direct path through the chamber.

Further, in prior construction, the flights have been extended outwardly horizontally, or substantially so, in order to effect a more even distribution of liquid over the surfaces of the baffles.

The construction of my present tower is a drastic departure from that of previously proposed contact or reaction towers. More particularly, the spiralled baffle of my present invention is so constructed and arranged that solids formed by the reaction are not permitted to accumulate on the baffle surfaces so as to clog the path of fluids through the chamber, which has been a serious objection to previous reaction towers. I accomplish this purpose by extending the flights inwardly from the inner walls of the chamber at a decided angle of depression. This angle is subject to variation depending upon the characteristics of the solids to be formed by the intended reaction, but, in all cases, should be at least somewhat greater than the angle of repose of the solids. An angle of depression of 30° to 60° is usually satisfactory for this purpose.

Further, the flights are so constructed and arranged as to avoid the use of a central core and so as to provide a direct, central, substantially vertical, unobstructed path through the chamber through which solids formed by the reaction and sliding inwardly along the upper surfaces of the baffles may fall to the bottom of the chamber where they accumulate and, from whence, they are withdrawn.

My tower is especially adapted to operations in which a gaseous medium is reacted with a liquid, or with a solid in solution in a liquid, and in which the tower is operated in a flooded condition. The liquid may be charged to the upper end of the tower and withdrawn from the lower end of the tower or vice versa, and suitable inlets and outlets are provided for this purpose. An outlet is also provided at the lower end of the chamber for the withdrawal of the solids, the chamber advantageously terminating at its lower end in a conical hopper bottom to facilitate accumulation and withdrawal of the solids or slurry.

The gaseous medium is, with advantage, introduced at a point near the lower end of the chamber and any residual gases, or gases formed by the reaction, withdrawn from near the top of the chamber above the liquid level. My tower is provided with suitable ports for accomplishing this purpose.

The invention will be further described and illustrated with reference to the accompanying drawing which represents, conventionally and somewhat diagrammatically, a vertical view of a particularly advantageous embodiment thereof.

The vertically elongated chamber is enclosed by the cylindrical walls 1 terminating at its lower end in a hopper bottom 2 and an outlet 3 for the accumulation and withdrawal of solids usually in the form of a slurry. The outlet 3 is provided with a conventional valve 4 for controlling the rate of withdrawal.

The valved connections 5 and 6 are provided for the charging and withdrawal of liquid to and from the tower, the rate of charge and withdrawal usually being regulated so as to maintain a liquid level near the upper end of the tower, as indicated at 7, as by means of a float valve indicated at 7a.

The gaseous medium may be introduced through the valved inlet 8 and any residual gases, or gases formed by the reaction, may be withdrawn from the tower through the valved outlet 9.

The interior of the tower is fitted with a spiral baffle 10, extending from near the lower end of the tower to near the upper end of the tower. This baffle may be supported by conventional means as by welding to the inner walls 1 of the chamber. Other means for supporting, or partially supporting, the baffles may be provided, such as conventionally used, providing a substantially vertical path in open communication with each of the flights of the helix and extending centrally through the helix is provided. The flight angle of the helix is subject to considerable variation. However, it is essential that the surfaces of the respective flights be inclined downwardly from the horizontal toward the center of the chamber so as to avoid the accumulation of solids thereon. In the apparatus shown in the drawing, the angle of depression of the flight surfaces is approximately 45°. However, as previously noted, a greater or lesser angle of depression is permissible, depending upon the character of the solids present in the chamber.

The gas inlet 8 is, with advantage, positioned in a side wall of the chamber so that the gas entering therethrough will flow upwardly through the liquid against the underside of the spiralled baffle. By reason of the angle of inclination of the baffle, the gas or liquid with gas dispersed therein tends to flow toward the periphery of the chamber and the passing of the gas along the central vertical path through the chamber is substantially completely avoided.

The entering gas, operating on the gas lift principle, causes the liquid within the chamber to spiral upwardly along the underside of the helical baffle to the upper end of the chamber and, from thence, downwardly through the central vertical path. At the upper end of the chamber, residual gas, or any gas formed by the reaction, is disengaged from the liquid and passes from the chamber through the gas outlet 9.

Any solids formed by the reaction, or otherwise present in the chamber, tend to separate out on the upper surface of the flights and, since the angle of depression of these surfaces toward the center of the chamber, is greater than the angle of repose of the solids, the deposited solids tend to slide down along the surfaces of the baffles and are carried downwardly by the descending stream of liquid to the lower end of the chamber where the solids are deposited and are withdrawn, usually as a slurry, through the valved outlet 3.

The size and relative dimensions of the tower are subject to considerable variation, depending upon its intended use, as is also the number of convolutions of the spiralled baffle. The relative size of the unbaffled central path through the tower is likewise subject to variation, depending primarily upon the desired rate of circulation of the liquid within the chamber. Usually a central opening through the chamber of a diameter of about 1/4 to 1/2 that of the chamber is generally advantageous. Under special conditions, a somewhat smaller or larger opening may be desirable.

Where the connection 6 is to be used as the liquid inlet, its position relative to the surface of the liquid within the chamber is relatively unimportant so long as the liquid is not entrained in the effluent gases. However, where the connection 6 is used as the liquid outlet, it is generally desirable that it be positioned below the liquid level so as to avoid the escape of gas therethrough.

Also, where the connection 5 is used as the liquid inlet, its position with respect to the next higher flight of the helical baffle is not of major importance, but, where used as the liquid outlet, it should be positioned a substantial distance below the next higher flight of the baffle so as to avoid the withdrawal of fresh gases dispersed in the liquid.

The apparatus may be constructed of any suitable material adapted to withstand intended operating conditions, for instance, ordinary steel, stainless steel, or even ceramic, or glass, or it may be lined with suitable corrosion-resistant materials, where corrosive gases or liquids are to be handled.

The optimum pitch of the spiral is generally dependent upon the viscosity of the liquid, the rate of gas throughput and the necessary contact time for the intended operation. In some instances, it is desirable to place supplemental baffles in the path of the upwardly spiralling fluid or to form corrugations in the spiral surfaces of the baffles so as to promote the breaking up of the gas into small bubbles and avoid the spiralling of the gas through the apparatus undispersed in the liquid.

The apparatus is of general utility in the carrying on of operations such as previously noted and may be used, with particular advantage, in carbonation processes such as described in the MacMullin and Day Patent No. 2,400,360, or in the ammonia soda process of carbonation of ammoniated brine wherein sodium bicarbonate is processed in the reaction tower.

I claim:

1. An apparatus of the type described which comprises a vertically elongated, closed, cylindrical chamber having a gas inlet at the lower end thereof and a gas outlet at the upper end thereof, and a helical flattened member disposed within a cylindrical chamber, the outer edge of the helical member being in fixed continuous contact with the inner surface of said chamber, the width of the helical member being less than the radius of the cylindrical chamber whereby an unobstructed vertical central passage throughout the extent of the helical member within the chamber in open communication with the flights of the helical member is obtained and the inclination of the flights in the helix from the horizontal downwardly toward the axial center of the baffle is at an angle within the range of 30° to 60°.

2. Apparatus as in claim 1, in which said helical baffle makes a plurality of complete turns in extending down the chamber.

JOHN F. HALLER.

REFERENCES CITED

The following references are of record in the file of this patent:

UNITED STATES PATENTS

| Number | Name | Date |
|---|---|---|
| 375,920 | Bradley | Jan. 3, 1888 |
| 826,729 | Marsh | July 24, 1906 |
| 1,406,525 | Bouillon | Feb. 14, 1922 |

FOREIGN PATENTS

| Number | Country | Date |
|---|---|---|
| 301,400 | Germany | June 14, 1921 |
| 47,009 | Norway | Oct. 14, 1929 |

OTHER REFERENCES

Eimer and Amend Catalogue (1936), 85th ed., pg. 131.